(12) United States Patent
Konold

(10) Patent No.: US 7,150,439 B2
(45) Date of Patent: Dec. 19, 2006

(54) CONFIGURABLE CLAMP ASSEMBLY

(76) Inventor: Donald Ross Konold, 23903 Malibu Knolls Rd., Malibu, CA (US) 90265

( * ) Notice: Subject to any disclaimer, the term of this patent is extended or adjusted under 35 U.S.C. 154(b) by 74 days.

(21) Appl. No.: 10/966,674

(22) Filed: Oct. 15, 2004

(65) Prior Publication Data

US 2006/0081744 A1   Apr. 20, 2006

(51) Int. Cl.
*F16L 3/12* (2006.01)

(52) U.S. Cl. .................... 248/74.1; 248/205.3

(58) Field of Classification Search .............. 248/74.1, 248/74.2, 74.3, 55, 56, 67.5, 68, 205.3, 205.4, 248/316.5, 231.51, 230.4, 229.23, 229.17
See application file for complete search history.

(56) References Cited

U.S. PATENT DOCUMENTS

| | | | |
|---|---|---|---|
| 3,397,431 A * | 8/1968 | Walker ...................... 403/344 |
| 3,810,596 A * | 5/1974 | Elm .......................... 248/74.3 |
| 3,913,876 A * | 10/1975 | McSherry .................. 248/74.3 |
| 4,037,810 A | 7/1977 | Pate |
| 4,317,262 A * | 3/1982 | Wells, Jr. .................. 24/16 PB |
| 4,561,153 A | 12/1985 | Matsui |
| 4,669,688 A | 6/1987 | Itoh et al. |
| 5,742,982 A * | 4/1998 | Dodd et al. ................ 24/16 R |
| 6,164,604 A * | 12/2000 | Cirino et al. .............. 248/74.3 |
| 6,710,249 B1 * | 3/2004 | Denton ...................... 174/65 G |
| 2004/0217236 A1 * | 11/2004 | Shibuya ..................... 248/68.1 |
| 2006/0006292 A1 * | 1/2006 | Kleeb et al. ............... 248/74.1 |

* cited by examiner

*Primary Examiner*—Ramon O Ramirez
(74) *Attorney, Agent, or Firm*—Jack Foy Campbell

(57) ABSTRACT

A configurable clamp assembly for retaining pipe, conduit, cable bundles, waveguides and fiber optic cable that is designed for rapid installation without the need of pre-drilled holes or other mounting surface preparation. The clamp is formed by a saddle structure with integral rectangular flat base plate that receives interchangeable mounting pads and either a securing fastener or adhesive layer that secures the clamp to a mounting surface. A clamping yoke is hingedly secured to the saddle structure that is adapted to fold about the hinge to enclose and retain pipes, conduits or a Collar that engages an interchangeable Insert. The clamping yoke is fastened with a locknut that engages a threaded retaining post, locking the yoke to the saddle. The Insert is provided with various cross section geometries to secure waveguides, fiber optic cables and specially shaped tubing and is designed for insertion into the Collar for special applications.

3 Claims, 11 Drawing Sheets

CONFIGURABLE CLAMP ASSEMBLY

CROSS-REFERENCE TO RELATED APPLICATIONS

Not Applicable

STATEMENT REGARDING FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISC

Not Applicable

BACKGROUND OF THE INVENTION

1. Field of the Invention

This invention relates to conduits such as pipe, cable, waveguide and supports provided by a universal clamping system formed from a combination clamp and support structure with an interchangeable support structure mounting pad, mounting collar and interchangeable insert with a variety of cross section geometries to accommodate pipe, cable, waveguide and conduit shapes as required. The term conduit as used through the remainder of this description shall be taken as a generic term for pipes, cables, tubes, rods, wires, waveguides and other conveyances for liquids, electrical current and etc.

2. Description of the Prior Art

The prior art contains a number of teachings of different clamps which have been developed over the years. Such clamps have been employed to engage or secure conduits in various configurations and on various surfaces; and have been mounted in different ways. Some clamps have been designed specifically to secure copper plumbing with the intent of preventing sound conduction from the pipe into the surrounding structure and preventing galvanic action or electrolysis. The invention described in U.S. Pat. No. 4,037,810 is a specific example.

Other clamp designs have been developed for mounting cable bundles having various shaped cross sections, mountings with self-locking anchors to secure the clamp to a surface mounting hole, and releasable clamp locking arrangements to secure either individual cables or cables bundles. Typical examples are designs described in U.S. Pat. No. 4,669,688, U.S. Pat. No. 4,317,262, and U.S. Pat. No. 4,561,153.

These designs address, in each case, a singular application and are not adaptable for uses other than the intended design. A need exists for a clamp design that serves many different applications, that has a releasable locking mechanism, and facilitates rapid installation to reduce labor and installation cost

BRIEF SUMMARY OF THE INVENTION

The present invention addresses the need for a multiple application configurable clamp design. This capability is provide by a clamp that includes a saddle portion with an integrated flat base plate and a yoke portion that is hingedly connected to the saddle. Both the yoke and saddle portions include a semicircular recess. The yoke is adapted to fold about the hinge relative to the saddle portion whereby an aperture is positioned in mutual alignment by a threaded retaining post that aligns the yoke with the saddle forming a circular cross section.

The yoke portion is secured to the saddle portion with the turn of a locknut placed upon the portion of the threaded retaining post that protrudes through the base formed by a notch in the yoke portion. The locknut aligns with the threaded retaining post that is part of the saddle portion and is threaded to receive the locknut. The yoke portion is allowed to swing open about the hinge by turning the locknut until the retaining post releases it.

The clamp is secured to any desired mounting surface by use of a pad that is adhesively secured to the bottom surface of the base. For installations that don't allow for penetration of the mounting surface material with a fastener, a pad is provided with an additional outer adhesive surface protected by a protective peel-off layer.

For installations where fasteners may be used, an aperture within the center of the saddle portion of the clamp is adapted to receive fasteners of various designs. The aperture is designed so that a fastener head is recessed into the saddle by a counter sink so that it will not contact the retained conduit. The fastener is aligned with the saddle aperture and driven through the mounting pad and into the mounting surface. To facilitate rapid installation with little or no surface preparation, a spine shaped fastener is used. The spines provided with the clamp are inserted with a standard driver tool selected for various surface materials including stucco, wood, sheet metal, and concrete. The standard driver tools include a hammer device for relatively soft mounting surfaces such as pinewood and a pyrotechnic driver using a 22 Cal. Cartridge for hardwoods and masonry. These standard driver tools are commonly found in building material supply outlets.

In one embodiment as described above, conduits are secured directly by the clamp where a circular cross section is sufficient and no special insulation provisions are required. Where there is a need to secure specialized cables and pipes requiring non-circular cross section geometries or special insulation requirements the configuration of the embodiment described below is provided.

Within the circular cross section formed by the closed yoke and saddle is a circular, collar retained by collar ribs whose inner surfaces come in contact with the outer surfaces of the saddle and the yoke, securing the collar in place. Slip-fit into the collar is a circular insert with various cross section geometries. The collar and inserts are provided with slot openings that allow for easy installation by opening them at the slot opening and then slipping the insert and then the collar over the object or objects being secured. Finally, the insert is pressed into the collar.

The circular, insert comes into contact with the object being secured. By selecting specific cross section geometries, cables, wire bundle, pipes, conduits or waveguides can be secured to any desired mounting surface with this clamp design. The same clamp can secure multiple objects of varying geometries by selecting an insert with those combined geometries.

The clamp saddle and the yoke are manufactured in non-ferrous metals including aluminum, brass and bronze. For applications requiring non-conducting clamps, the components are manufactured in PVC.

The collar and inserts are single-piece injection molded plastic or Teflon™. For special installations requiring vibration isolation and/or thermal insulation, the inserts will be fabricated from compatible materials.

The base pads are provide in several materials and thicknesses to accommodate smooth to rough surfaces and to also provide additional vibration isolation and thermal insulation.

DETAILED DESCRIPTION OF THE INVENTION

Figure 1:
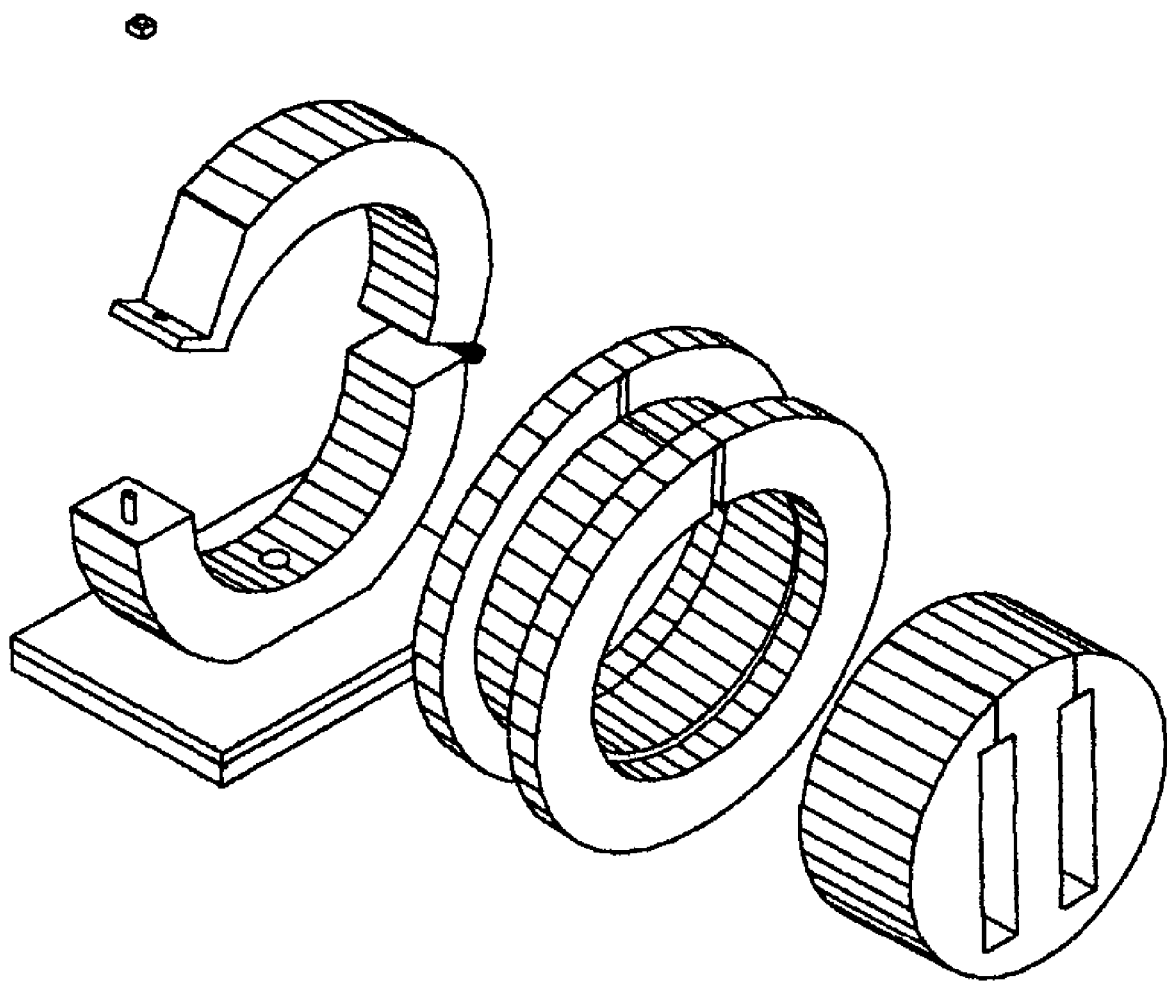
FIG. 1 is an isometric exploded view of the configurable clamp assembly showing the components that form the assembly.

The exploded isometric view of FIG. 1 depicts the major components included in the configurable clamp assembly: a saddle with hingedly connected yoke, a collar, and an insert. These are combined in several embodiments described below whose configurations are driven by the requirements of the particular installation.

The first embodiment is a standard installation that requires minimum insulation and isolation provisions, but requires that a Configurable Clamp Assembly (10) be adhesively secured to a mounting surface (45) because surface penetrating fasteners cannot be used.

Figure 2:
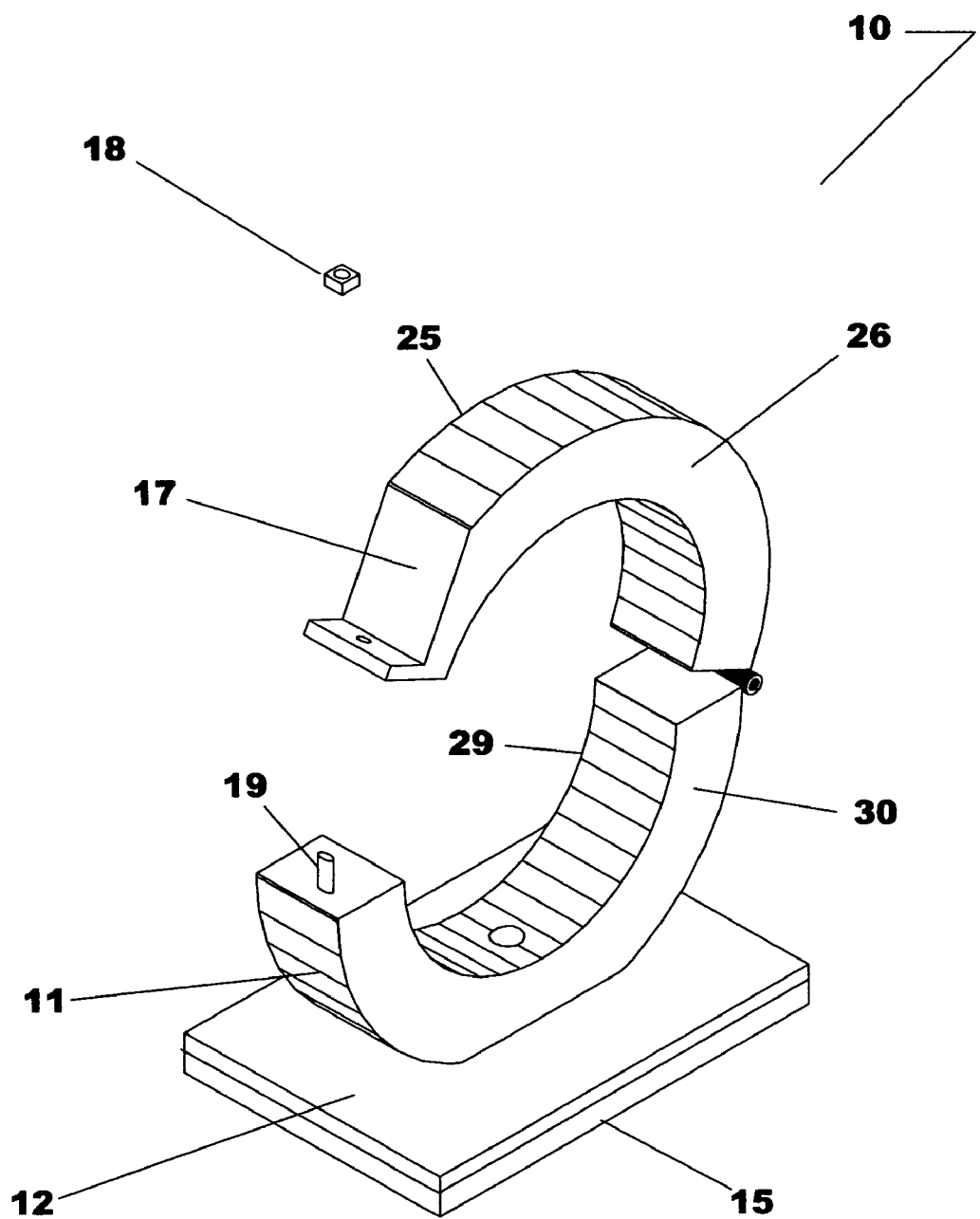
FIG. 2 is a perspective view of the clamp showing the clamp yoke hingedly mounted to the saddle with integral rectangular flat base plate, base pad, threaded retaining post, and locknut.
Figure 3:
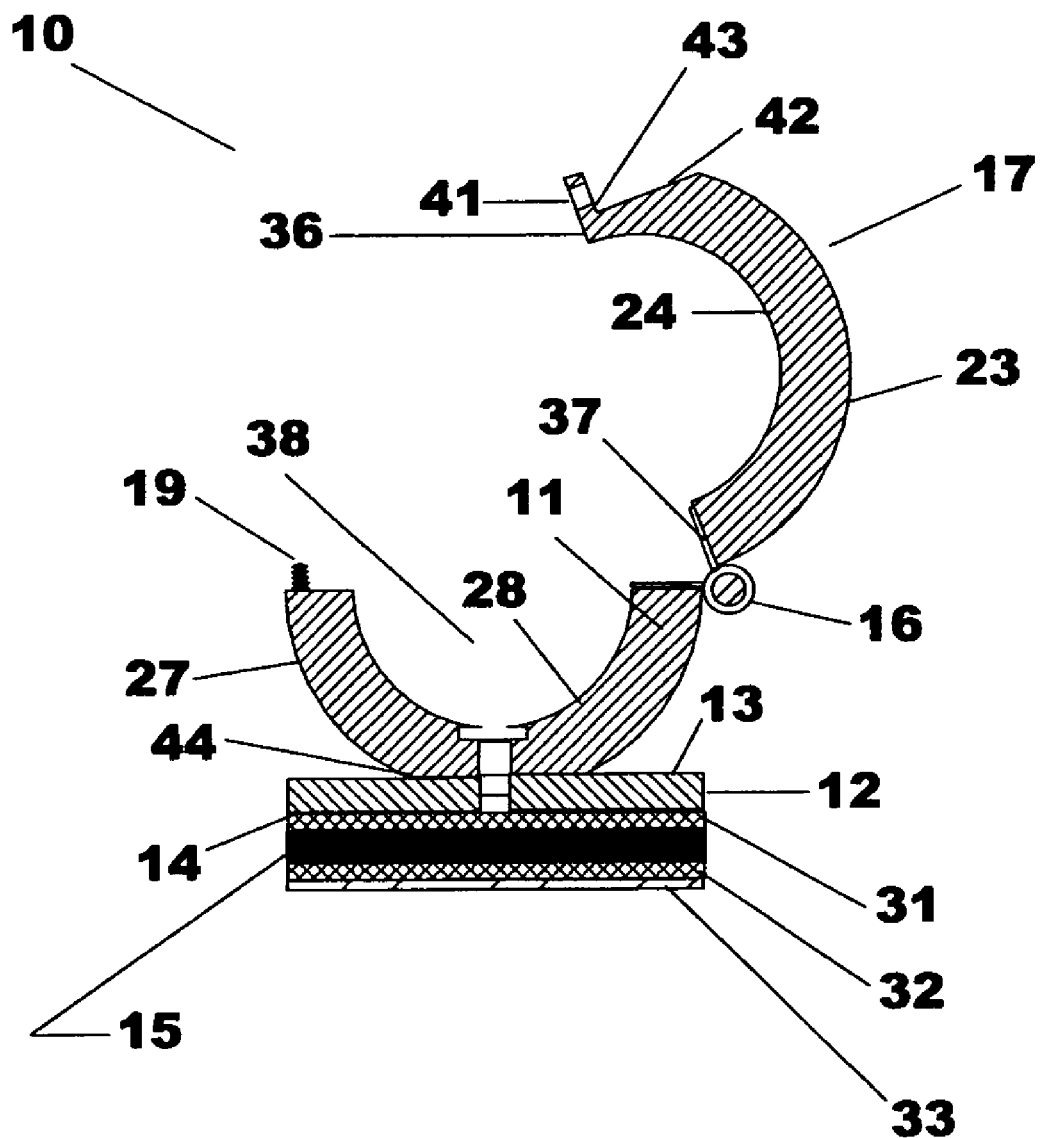
FIG. 3 is a clamp cross-section of the adhesively mounted embodiment.
Figure 4:
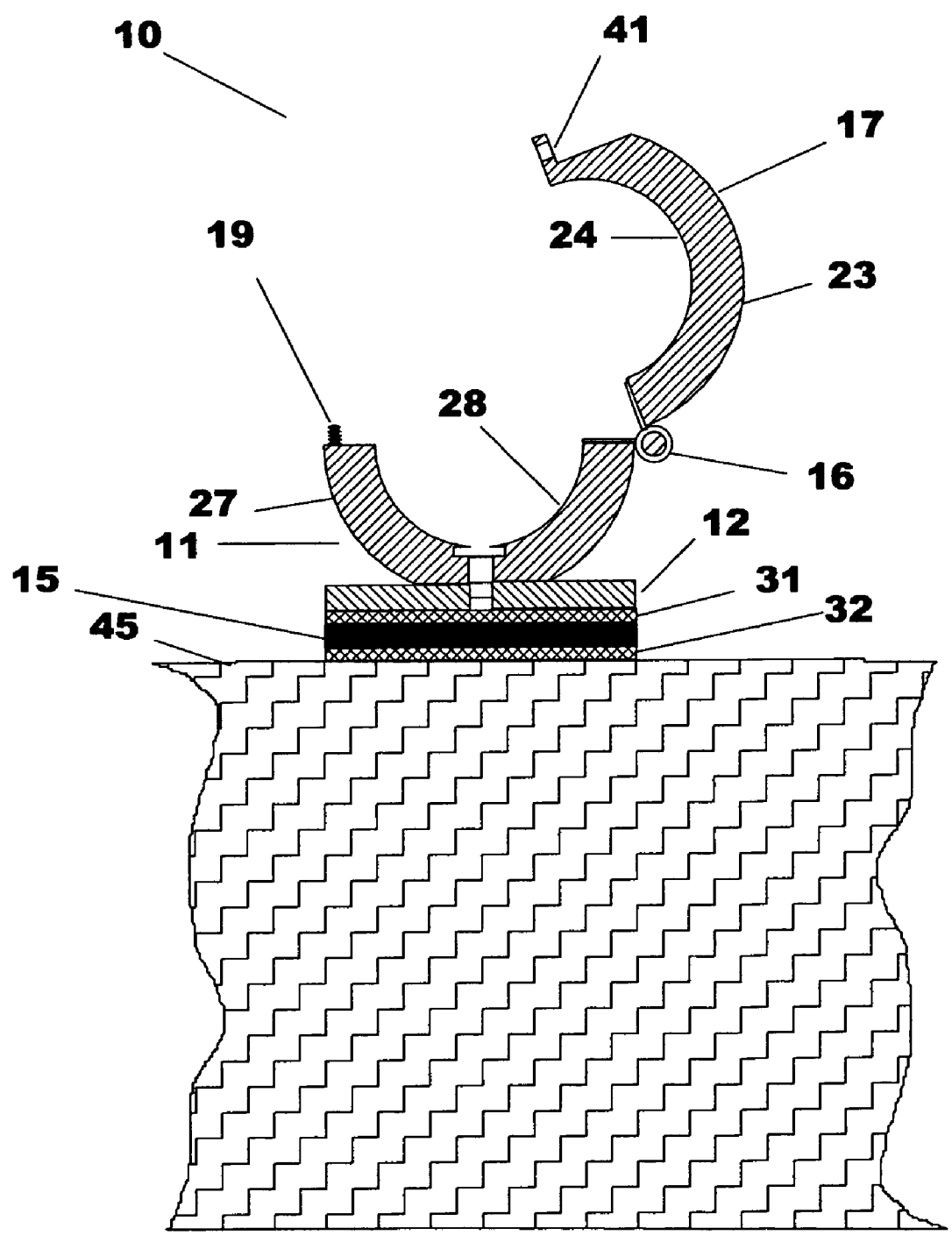
FIG. 4 is clamp cross-section of the adhesively mounted embodiment mounted on a surface.

The first embodiment of the Configurable Clamp Assembly (10) as shown in the isometric view of FIG. 2 and the cross section view of FIG. 3 includes a Saddle (11) with an integrated Rectangular Flat Base Plate (12) including a Base Plate Top Surface (13) and a Base Plate Bottom Surface (14) and a Yoke (17) that is connected to the Saddle (11) by a Hinge (16).

The Saddle (11) is an arcuate structure defined by a Saddle Inner curve (28), a Saddle Outer Curve (27) and a Saddle $1^{st}$ Side (29) and a Saddle $2^{nd}$ Side (30). The Saddle (11) width is fixed by the distance between the Saddle $1^{st}$ Side (29) and the Saddle $2^{nd}$ Side (30). The Saddle (11) is terminated by a Saddle $1^{st}$ End Surface (34) and a $2^{nd}$ Saddle End Surface (35). The Saddle Inner Curve (28) forms a $1^{st}$ Semicircular Recess (38). Affixed to the $2^{nd}$ Saddle End Surface (35) is a Hinge (16). Centrally embedded in the Saddle $1^{st}$ End Surface (34) is a Threaded Retaining Post (19) that is positioned for registration with a Yoke Alignment Aperture (41) and engagement with a Locknut (18).

The Yoke (17) is an arcuate structure defined by a Yoke Inner curve (24), a Yoke Outer Curve (23). The Yoke (17) width is fixed by the distance between a Yoke $1^{st}$ Side (25) and a Yoke $2^{nd}$ Side (26) and is selected to be identical to the Saddle width. The Yoke (17) is terminated by a Yoke $1^{st}$ End Surface (36) and a Yoke $2^{nd}$ End Surface (37). The Yoke Inner Curve (24) forms a $2^{nd}$ Semicircular Recess (39). Affixed to the Yoke $2^{nd}$ End Surface (35) is a Hinge (16). The Yoke (17) attaches to the Saddle (11) by the Hinge (16) as shown in FIG. 3.

Figure 15:
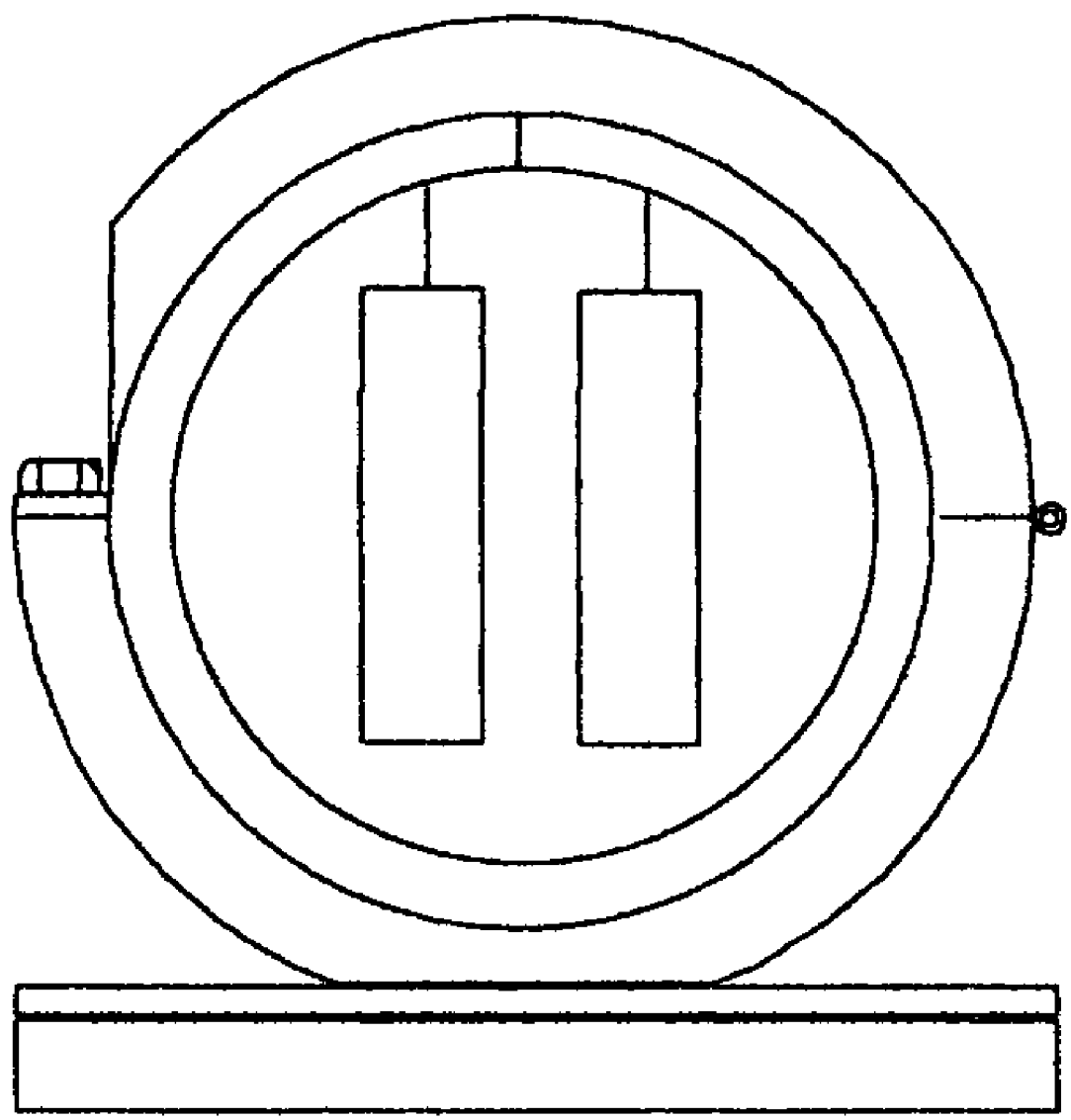
FIG. 15 is a side view of the configurable clamp assembly after assembly with the collar and an insert.

Distally displaced along the Yoke Outer Curve (23) and set back from the Yoke $1^{st}$ End Surface (36) is a Notch (42). The portion of the $1^{st}$ end surface (36) not removed by the notch (42) forms a notch base (43). The Notch (42) is dimensioned to allow the Locknut (18) to be freely rotated as shown in assembled clamp side view of FIG. 15. Centrally aligned with the Notch Base (43) formed in the Yoke Outer Curve (23) is a Yoke Alignment Aperture (41) that penetrates through the Yoke (17) and exits the Yoke $1^{st}$ End Surface (36) as shown in FIG. 3.

The Yoke (17) is adapted to fold about the Hinge (16) to allow the Threaded Retaining Post (19) to align with the yoke alignment aperture (41), causing the Yoke (17) to align with the Saddle (11). A Locknut (18) placed on the Threaded Retaining post (19) engages the threads and is tightened to secure the Yoke (17) to the Saddle (11) enclosing and retaining conduits of any configuration.

The Saddle (11) is integrally attached to the center of the Rectangular Flat Base Plate (12). A Flat Surface (44) centered on the Saddle Outer Curve (27) interfaces the Base Plate Top Surface (13).

The exposed Base Plate Bottom Surface (14) of the Rectangular Flat Base Plate (12) is coated with a $1^{st}$ Adhesive Layer (31). The $1^{st}$ Adhesive Layer (31) secures a Base Pad (15) to the exposed Base Plate Bottom Surface (14) of the Rectangular Flat Base Plate (12). A $2^{nd}$ Adhesive Layer (32) is applied to the exposed surface of the Base Pad (15). This $2^{nd}$ Adhesive Layer (32) adhesively secures the Configurable Clamp Assembly (10) to any mounting surface (45) where intrusive fasteners are not allowed. To protect the $2^{nd}$ Adhesive Layer (32) until installation, a Protective Peel-Off Layer (33) is applied to the $2^{nd}$ Adhesive Layer (32) that dimensionally matches the Rectangular Flat Base Plate (12) dimensions.

The Base Pad (15) has the same rectangular shape and dimensions as the Rectangular Flat Base Plate (12). Various materials and thicknesses are used to fabricate the Base Pad (15) to accommodate installation on smooth to rough surfaces and to provide vibration isolation and thermal insulation as required for each application.

In the second embodiment, rapid installation that is more permanent is desired and surface penetrating fasteners are allowed but only a standard installation requiring minimum insulation and isolation provisions are needed.

Figure 5:
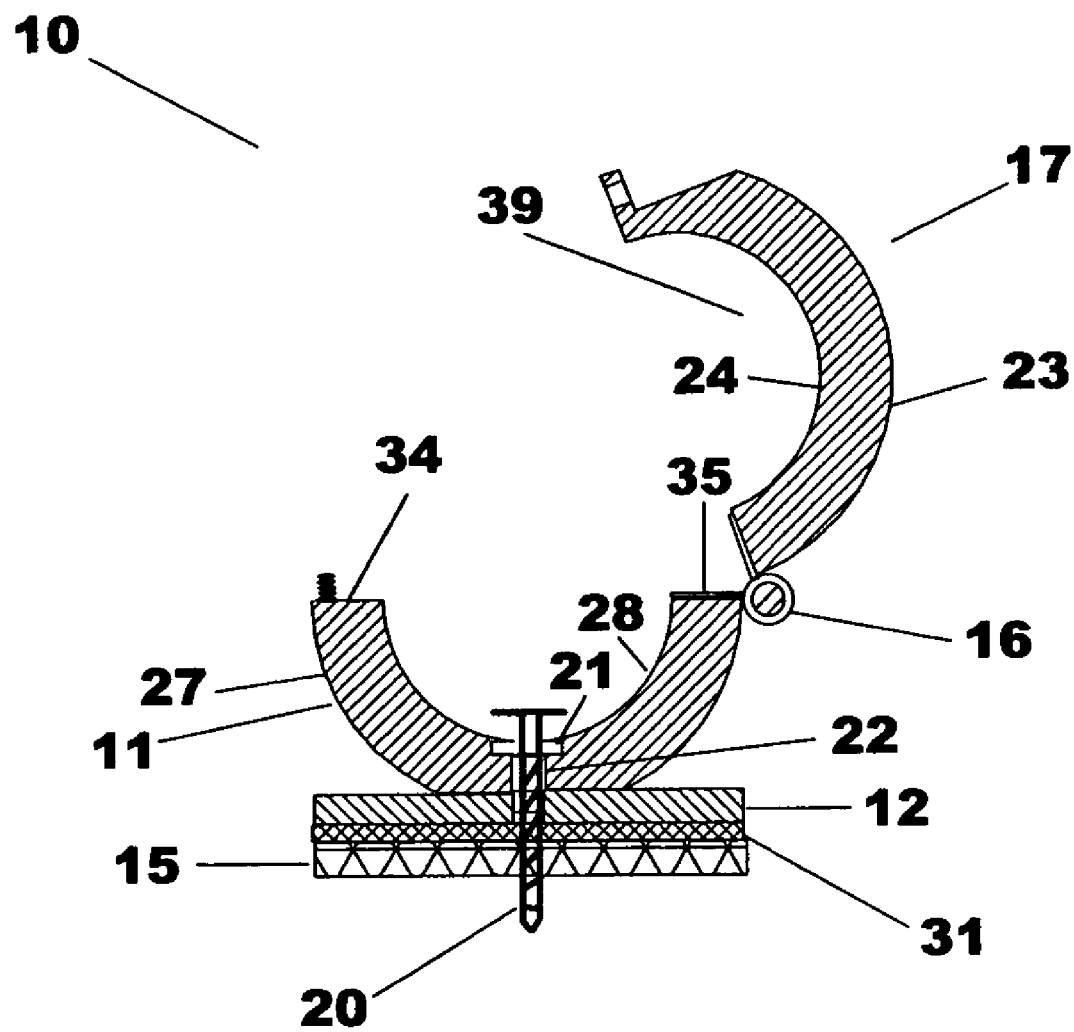
FIG. 5 is a clamp cross-section of the fastener mounted embodiment.
Figure 6:
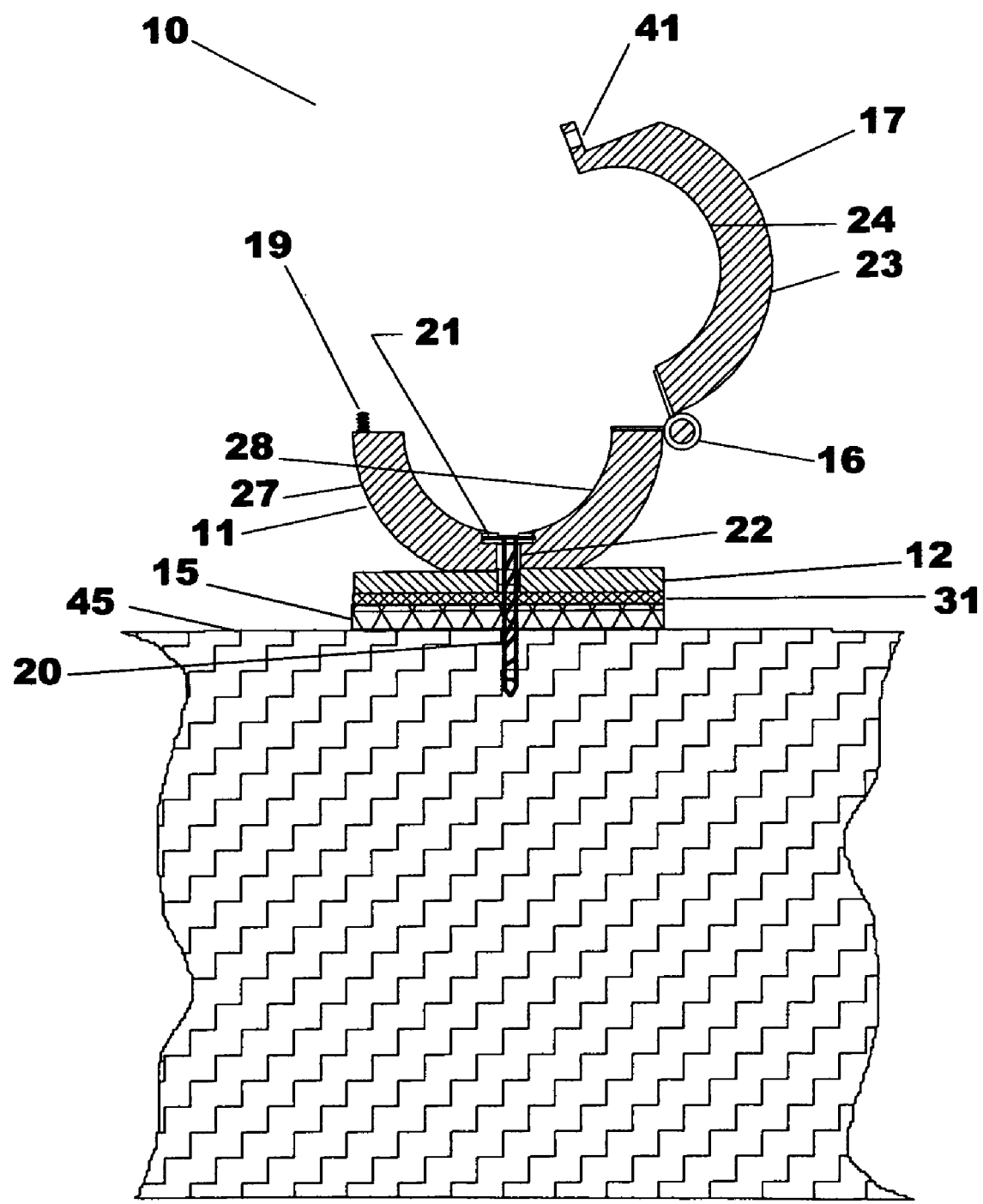
FIG. 6 is a clamp cross-section mounted on a surface using a fastener.

In this second embodiment of the Configurable Clamp Assembly (10) as shown in the section views of FIGS. 5 and 6 includes a Saddle (11) with an integrated Rectangular Flat Base Plate (12) including a Base Plate Top Surface (13) and a Base Plate Bottom Surface (14) and a Yoke (17) that is connected to the Saddle (11) by a Hinge (16).

The Saddle (11) is an arcuate structure defined by a Saddle Inner curve (28), a Saddle Outer Curve (27) and a Saddle $1^{st}$ Side (29) and a Saddle $2^{nd}$ Side (30). The Saddle (11) width is fixed by the distance between the Saddle $1^{st}$ Side (29) and the Saddle $2^{nd}$ Side (30). The Saddle (11) is terminated by a Saddle $1^{st}$ End Surface (34) and a $2^{nd}$ Saddle End Surface (35). The Saddle Inner Curve (28) forms a $1^{st}$ Semicircular Recess (38). Affixed to the $2^{nd}$ Saddle End Surface (35) is a Hinge (16). Centrally embedded in the Saddle $1^{st}$ End Surface (34) is a Threaded Retaining Post (19) that is positioned for registration with a Yoke Alignment Aperture (41) and engagement with a Locknut (18).

The Yoke (17) is an arcuate structure defined by a Yoke Inner curve (24), a Yoke Outer Curve (23). The Yoke (17) width is fixed by the distance between a Yoke $1^{st}$ Side (25) and a Yoke $2^{nd}$ Side (26) and is selected to be identical to the Saddle width. The Yoke (17) is terminated by a Yoke $1^{st}$ End Surface (36) and a Yoke $2^{nd}$ End Surface (37). The Yoke Inner Curve (24) forms a $2^{nd}$ Semicircular Recess (39). Affixed to the Yoke $2^{nd}$ End Surface (35) is a Hinge (16). The Yoke (17) attaches to the Saddle (11) by the Hinge (16) as shown in FIG. 5.

Distally displaced along the Yoke Outer Curve (23) and set back from the Yoke $1^{st}$ End Surface (36) is a Notch (42). The portion of the $1^{st}$ end surface (36) not removed by the notch (42) forms a notch base (43). The Notch (42) is dimensioned to allow the Locknut (18) to be freely rotated as shown in assembled clamp side view of FIG. 15. Centrally aligned with the Notch Base (43) formed in the Yoke Outer Curve (23) is a Yoke Alignment Aperture (41) that penetrates through the Yoke (17) and exits the Yoke $1^{st}$ End Surface (36) as shown in FIG. 3.

The Yoke (17) is adapted to fold about the Hinge (16) to allow the Threaded Retaining Post (19) to align with the yoke alignment aperture (41), causing the Yoke (17) to align with the Saddle (11). A Locknut (18) placed on the Threaded Retaining post (19) engages the threads and is tightened to secure the Yoke (17) to the Saddle (11) enclosing and retaining conduits of any configuration.

The Saddle (11) is integrally attached to the center of the Rectangular Flat Base Plate (12). A Flat Surface (44) centered on the Saddle Outer Curve (27) interfaces the Base Plate Top Surface (13).

FIG. 5 depicts the embodiment of for rapid clamp installations. As shown, a Spine Assembly (20) is inserted through an Aperture (22) centrally located within the Saddle (11) and the Rectangular Flat Base Plate (12) that penetrates both the Saddle (11) and its Rectangular Flat Base Plate (12). At the Saddle Inner Curve (28), a Counter Sink (21) is aligned with the Aperture (22) to recess the Spine Assembly (20) below the Saddle Inner Curve (28) surface to so that it does not contact or interfere with the retained conduits.

The Spine assembly (20) permanently attaches the Configurable Clamp Assembly (10) to a mounting surface (45) of choice. As shown in FIG. 6, the Spine assembly (20) is inserted into Aperture (22) and then with a driver unit selected for various surface materials drives the Spine assembly (20) through the Base Pad (15) into the surface material until the Spine assembly (20) engages the Saddle (11) Counter Sink (21), firmly and permanently securing the Configurable Clamp Assembly (10) to the mounting surface (45).

Another embodiment provides additional insulation and isolation capability with the use of a Collar (50) and an Insert (70).

Figure 7:
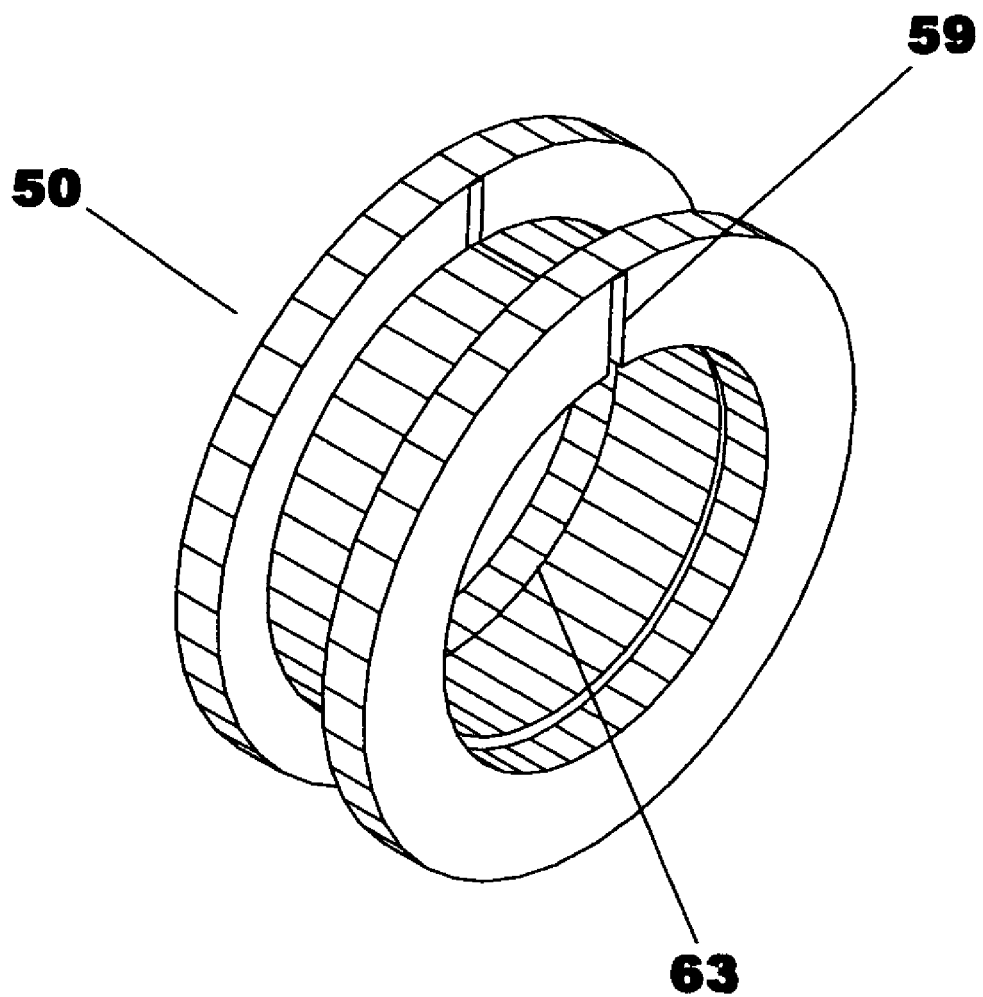
FIG. 7 is an isometric view of the collar.
Figure 8:
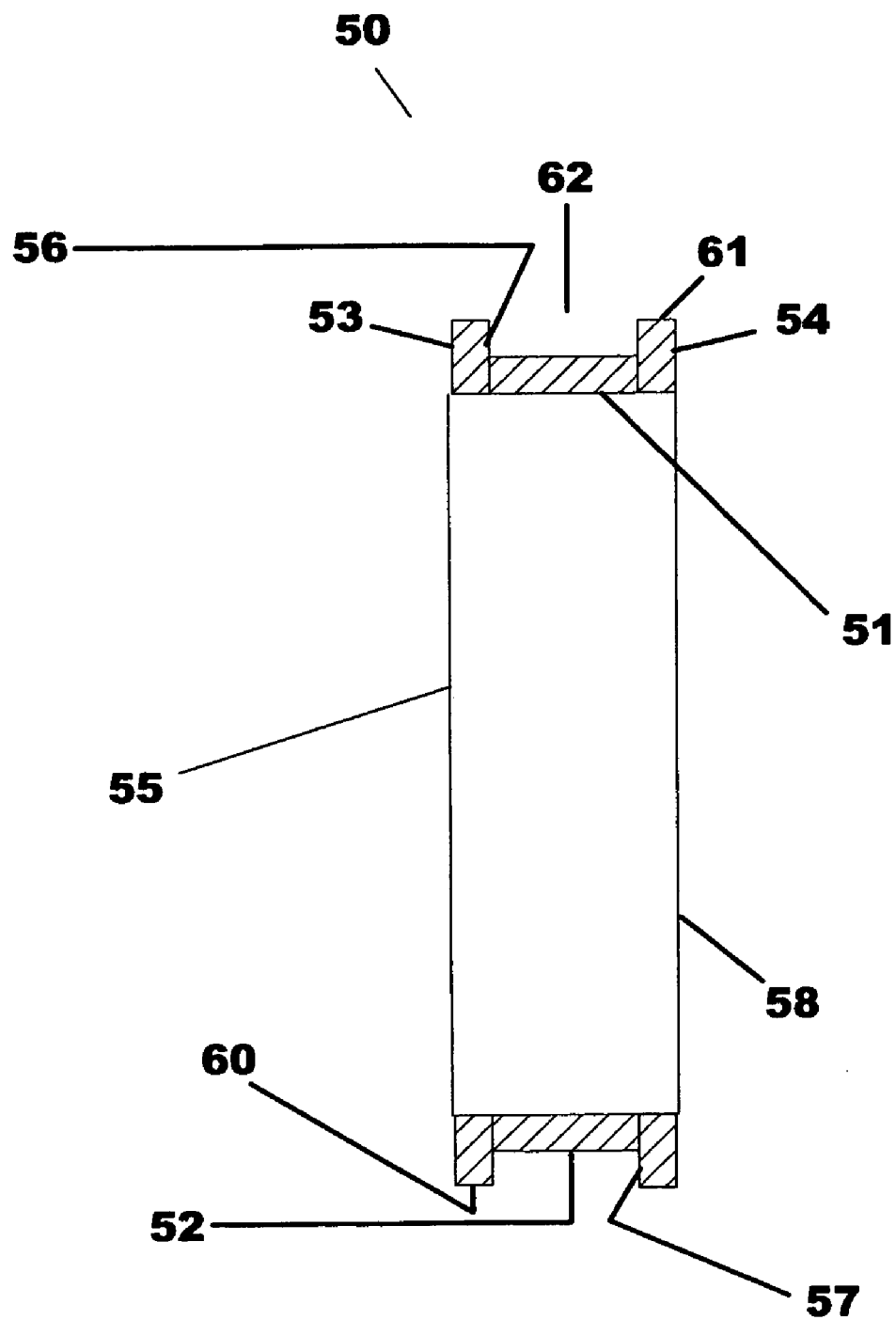
FIG. 8 is a cross-section view of the collar.

The Collar (50) as shown in the isometric view of FIG. 7 and the cross section view of FIG. 8 is a ring-shaped object having an Inner Diameter Ring Surface (51), an Outer Diameter Ring surface (52), a Collar Front Surface (55), and a Collar Back Surface (58). The Outer Diameter Ring surface (52) is bounded by two protrusions identified as a $1^{st}$ Rib (53) and a $2^{nd}$ Rib (54). The $1^{st}$ Rib outer surface is part of the Collar Front Surface (55). The $1^{st}$ Rib is bounded by the Collar Front Surface (55), a $1^{st}$ Rib Inner Surface (56) that intersects with the Outer Diameter Ring Surface (52) and a 1st Rib Top Surface (60). The $2^{nd}$ Rib outer surface is part of the Collar Back Surface (58). The $2^{nd}$ Rib is bounded by the Collar Back Surface (58), a $2^{nd}$ Rib Inner Surface (57) that intersects with the Outer Diameter Ring Surface (52) and $2^{nd}$ Rib Top Surface (61).

A Channel (62) is thereby formed around the circumference of the Collar (50) bounded by the $1^{st}$ Rib Inner Surface (56), the Outer Diameter Ring Surface (52), and the $2^{nd}$ Rib Inner Surface (57). The channel (62) is sized to fit over a portion of the volume defined by the Yoke $1^{st}$ Side (25), the Yoke Inner curve (24), the Yoke $2^{nd}$ Side (26), Saddle $1^{st}$ Side (29), the Saddle Inner curve (28), and the Saddle $2^{nd}$ Side (30) of the Configurable Clamp Assembly (10).

The $1^{st}$ Rib (53) and the $2^{nd}$ Rib (54) prevent the Collar (50) from disengaging from the Configurable Clamp Assembly (10) after the Yoke (17) is closed and secured to the Saddle (11).

The Collar (50) is formed from a single-piece injection molded plastic or Teflon™ material to provide corrosion resistance. Other material are selectable that are compatible with room-ambient and high temperature applications.

Figure 9:
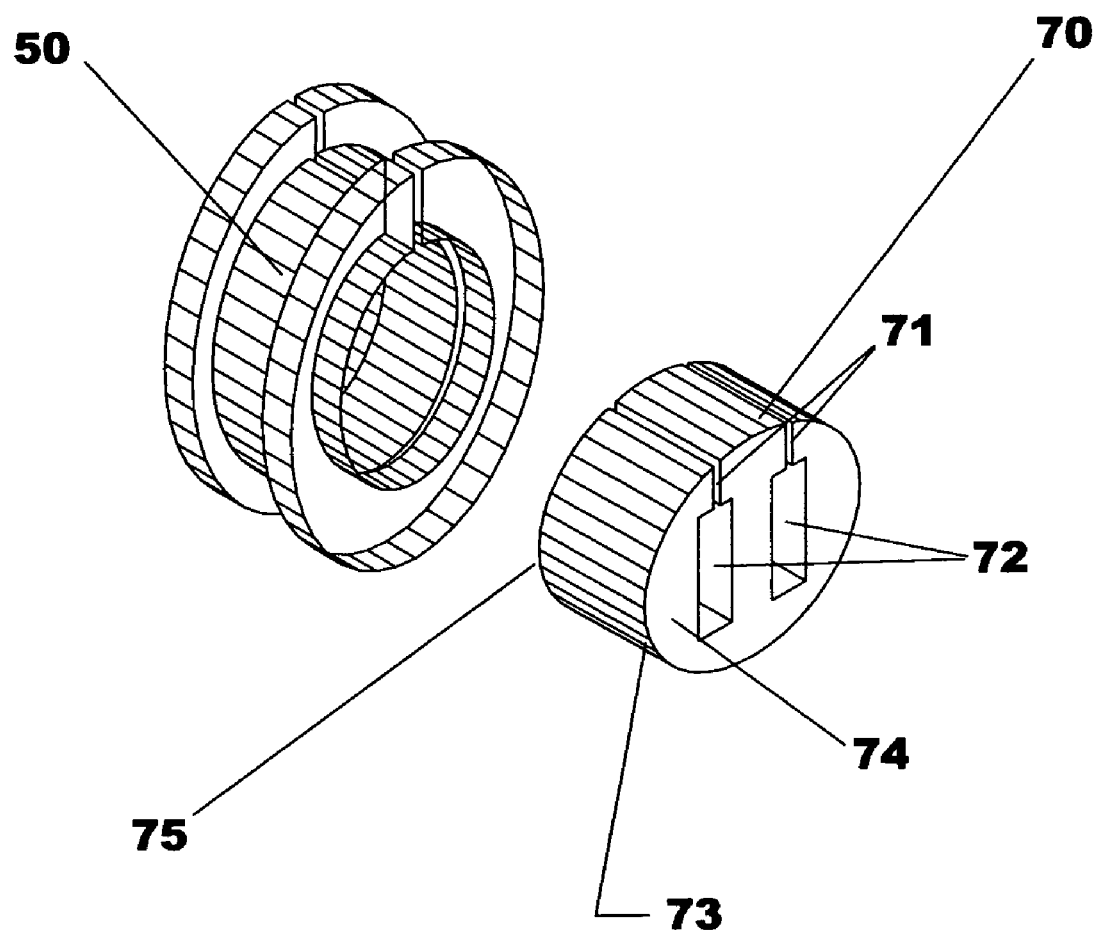
FIG. 9 is an isometric exploded view of the collar and the insert.
Figure 10:
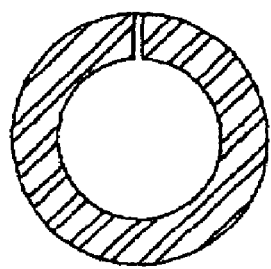
FIG. 10 is a cross-section view of an insert for a single pipe or cable.
Figure 11:
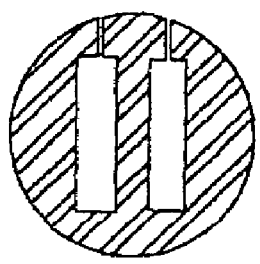
FIG. 11 is a cross-section view of an insert for two waveguides.
Figure 12:
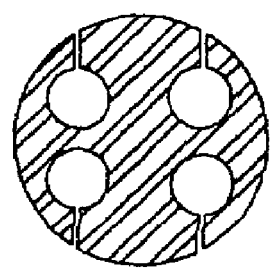
FIG. 12 is a cross-section view of an insert for four cable or tubes.
Figure 13:
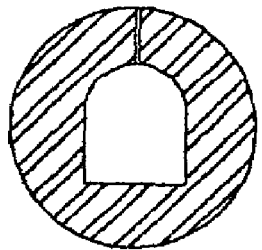
FIG. 13 is a cross-section view of an insert for a special shape.
Figure 14:
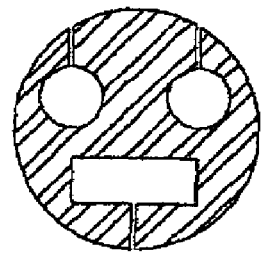
FIG. 14 is a cross-section view of an insert for two cables and a waveguide.

When required for special cross sectional shapes, vibration reduction, galvanic reaction prevention, electrical insulation or thermal insulation applications, an Insert (70) will be provided. The Insert (70) includes an Insert Outer Diameter (73), an Insert Front Surface (74), and Insert Back Surface (75), Insert Slot Opening(s) (71) and a Cavity (72) within the Insert (70). The Insert (70) width is defined by the distance between the Insert Front Surface (74), and the Insert Back Surface (75). The Insert Outer Diameter (73) and width are selected to match the Inner Diameter Ring Surface (51) and width of the Collar (50) to facilitate pressing the Insert (70) into the Collar (50) and securing it as shown in the exploded isometric view of FIG. 9

The Insert (70) is installed around the conduit being secured by the Configurable Clamp Assembly (10) using the Insert Slot Opening (71) to gain access to the Cavity (72) within the Insert (70).

The Collar (50) is installed around the pipe, tube, conduit or cable being secured by the Configurable Clamp Assembly (10) using the Collar Slot Opening (59) to gain access to the Circular Cavity (63) bounded by the Inner Diameter Ring Surface (51). Then the Insert (70) is pressed into the Collar (50) to complete the assembly. Finally, the Collar (50) is placed on the Saddle (11) portion of the Configurable Clamp Assembly (10), the Yoke (17) is closed and secured to the Saddle (11), and the Locknut (18) tightened on to the Threaded Retaining Post (19) as depicted in the side view of FIG. 15.

The Insert (70) will be provided in many Cavity (72) geometries and Insert Slot Opening (71) configurations as shown in FIGS. 10 through 14. The configurations shown are for example only and are not to be construed as limiting this patent disclosure to only those possible configurations.

A described in the embodiments detailed above, the Configurable Clamp Assembly (10) is either adhesively secured to the mounting surface or secured by a spine or other fastener that penetrates the mounting surface using hand tools or a driver unit.

The driver unit includes standard tools such as a hammer for relatively soft mounting surfaces, such as pinewood, and a pyrotechnic driver using a 22 Cal. Cartridge for hardwoods and masonry. These standard driver tools are commonly found in building material outlet stores. Different types of spines are selected for various surface materials including, but not limited to, stucco, wood, sheet metal, and concrete. Threaded fasteners, such as screws, or nails could be substituted for the spine assembly (20).

Configurable Clamp Assembly (10) removal is accomplished by several methods depending on whether the Configurable Clamp Assembly (10) is adhesively secured or secured by a spine assembly (20), nail, screw or bolt.

For an adhesively secured Configurable Clamp Assembly (10), a thin edged tool such as a knife, chisel or a putty knife is inserted blow the Base Pad (15) and force is applied such that the tool's thin edge separates the pad from the adhesive, causing the Configurable Clamp Assembly (10) to disengage from the mounting surface.

A Configurable Clamp Assembly (10) secured by a spine or a nail is removed form the mounting surface by inserting a standard pry bar under the Base Pad (15) and applying levered force that vertically moves the Configurable Clamp Assembly (10) and spine assembly (20) or nail up and away from the surface.

Where threaded fasteners, such as screws or bolts, are used for installation, they are removed by backing out the fastener out by a screwdriver or socket driver and lifting the Configurable Clamp Assembly (10) and the Base Pad (15) free from the surface.

If the surface is hard, such as masonry, the spine assembly (20) is snapped off by the levered force applied by the pry bar, allowing the Configurable Clamp Assembly (10) and the Base Pad (15) to be lifted free. The imbedded spine assembly (20) portion protruding from the surface can be cut off at the surface with dikes or wire cutters.

The Configurable Clamp Assembly (10) is manufactured in non-ferrous metals including aluminum, brass and bronze in a number of sizes to accommodate different size cable and pipe diameters. For applications requiring non-conducting clamps, PVC would be the selected material. The standard configuration retains circular cable and pipes, but other cross sections such as rectangular and oval are accommodated.

The Insert (70) is configured to retain and protect specialized cables and pipes. Specialized configurations are provided with variable geometric cross-sections to retain waveguides, multiple fiber optic cables and tubes with neutral pressure and maintain prescribed routing alignment. Mixed cross sections that are combinations of shapes and sizes for different types of cable and pipes that are routed along common paths are also provided.

In general, the Inserts (70) and the Collar (50) are manufactured as single-piece injection molded plastic or Teflon™ parts. Included are Inserts (70) made from soft-to-hard insulating materials for installations intended to prevent electrolytic or galvanic reaction of dissimilar metals. The Insert (70), the Collar (50) and the Configurable Clamp Assembly (10) are also manufactured in high temperature compatible materials to accommodate various installation environments. Regardless of the application, all selected materials are corrosion resistant.

What is claimed is:

1. A Configurable Clamp Assembly comprising a Saddle with integral Rectangular Flat Base Plate; a Yoke that is secured to the Saddle by a Hinge and adapted to fold about the Hinge to mate with the Saddle; a Threaded Retaining Post and Locknut for securing the Yoke to the Saddle; and a Collar that is a ring shaped object with an Inner Diameter Ring Surface, an Outer diameter Ring surface, a Collar Front Surface, a Collar Back Surface, a $1^{st}$ Rib; and a $2^{nd}$ Rib.

2. The Configurable Clamp Assembly of claim 1 where the Collar includes a Channel formed around the circumference of the Collar that is bounded by a $1^{st}$ Rib Inner Surface, an outer Diameter Ring Surface and the $2^{nd}$ Rib inner surface that fits on the Yoke and Saddle preventing the Collar from disengaging from the Configurable Clamp Assembly after the Yoke is closed and secured to the Saddle.

3. The Configurable Clamp Assembly of claim 1 where the collar further includes a Collar Slot Opening sized to fit over and around tubes, waveguides and cables of varying geometries, and an insert to provide additional insulation and isolation cable support when clamped in the configurable clamp assembly.

* * * * *